United States Patent [19]

Semenza, Jr.

[11] Patent Number: 4,670,494
[45] Date of Patent: Jun. 2, 1987

[54] FLAME RETARDANT LOW SMOKE POLY(VINYL CHLORIDE) THERMOPLASTIC COMPOSITION

[75] Inventor: Nicholas J. Semenza, Jr., Waltham, Mass.

[73] Assignee: Gary Chemical Corp., Leominster, Mass.

[21] Appl. No.: 760,669

[22] Filed: Jul. 30, 1985

[51] Int. Cl.$^4$ ............................................... C08K 5/52
[52] U.S. Cl. .................... 524/141; 524/406; 524/437; 174/110 S; 174/110 R
[58] Field of Search ............. 524/406, 437, 141; 525/239; 174/110 S, 110 R

[56] References Cited

U.S. PATENT DOCUMENTS

| | | | |
|---|---|---|---|
| 3,341,628 | 9/1967 | Buning et al. | 525/239 |
| 3,566,009 | 2/1971 | Lamond et al. | 174/116 |
| 3,576,940 | 5/1971 | Stone et al. | 117/218 |
| 3,579,608 | 5/1971 | DeCoste | 525/115 |
| 3,623,940 | 11/1971 | Gladstone et al. | 428/379 |
| 3,745,223 | 7/1973 | Lania et al. | 174/113 R |
| 3,823,255 | 7/1974 | La Gase et al. | 174/113 R |
| 3,845,166 | 10/1974 | Betts et al. | |
| 3,868,341 | 2/1975 | Sauer et al. | 117/137 |
| 3,869,420 | 3/1975 | Mathis et al. | 524/141 |
| 3,900,533 | 8/1975 | Krackeler et al. | 117/136 |
| 3,928,210 | 12/1975 | Peterson | 428/290 |
| 3,935,369 | 1/1976 | George et al. | 428/379 |
| 3,941,908 | 3/1976 | Valia et al. | 117/136 |
| 3,943,087 | 3/1976 | Leuchs et al. | 524/141 |
| 3,944,717 | 3/1976 | Hacker et al. | 174/23 C |
| 3,998,715 | 12/1976 | Bohm et al. | 204/159.16 |
| 4,008,368 | 2/1977 | Leuchs | 174/120 R |
| 4,018,893 | 4/1977 | Pedlon | 174/135 |
| 4,064,359 | 12/1977 | Peterson et al. | 174/107 |
| 4,098,748 | 7/1978 | Moore et al. | 524/141 |
| 4,225,649 | 9/1980 | Peterson | 428/383 |
| 4,331,733 | 5/1982 | Evans | 428/379 |
| 4,381,364 | 4/1983 | Georgacopoulos et al. | 524/373 |
| 4,430,384 | 2/1984 | George | 428/377 |
| 4,462,831 | 7/1984 | Raevsky et al. | 428/242 |
| 4,544,685 | 10/1985 | Hoelzer | 524/406 |

OTHER PUBLICATIONS

H. P. Desai and R. D. Dearin: Org. Coating, Appl. Polym. Sci. Proc. 48, 806-10 (1983).
F. W. Moore, Soc. Plast. Eng. Tech. Rep. 23, 414-416 (1977).
F. W. Moore and D. A. Church, Fire Retard., Proc. Int. Symp. Flammability Fire Retard. (1977), 216-217.
R. V. Price: *J. Vinyl Technology*, 1, 98-106, (1979).
CA 87 85704b.
CA 87 152,861r.
CA 89 111,413u.
CA 93 169140b.
CA 93 187,337a.
CA 94 176,007n.
CA 95 20,495k.
CA 97 24728x.
CA 100 122191s.
CA 100 140139k.
CA 100 140259z.
CA 100 140260t.
CA 100 211026j.
CA 102 79752c.
American Standard Test Method, Nos. D2863-77, D4100-82 and E662-83.
B. Carmoin et al, J. Macromol. Sci.-Phys., B14(2), 307-321 (1977).
D. B. Clark et al, Polymer Engineering and Science, 22, 698-704 (1982).
L. Bohn, Rubber Chemistry and Technology, 41, 495-513 (1968).

*Primary Examiner*—Veronica P. Hoke
*Attorney, Agent, or Firm*—Weingarten, Schurgin, Gagnebin & Hayes

[57] ABSTRACT

A flame retardant low smoke PVC-based thermoplastic composition for use in wire insulation and cable jacketing is disclosed. The composition includes poly(vinyl chloride), chlorinated poly(vinyl chloride), molybdenum oxide, alumina trihydrate, and isodecyl diphenyl phosphate as its primary ingredients, and additionally includes at least one heat stabilizer, at least one antioxidant, at least one lubricant, and at least one plasticizer besides the isodecyl diphenyl phosphate. It may also include antimony oxide, fillers, and chlorinated paraffins. The composition has excellent flame retardancy and produces only a relatively small amount of light-colored smoke when burned.

14 Claims, No Drawings

FLAME RETARDANT LOW SMOKE POLY(VINYL CHLORIDE) THERMOPLASTIC COMPOSITION

FIELD OF THE INVENTION

This invention relates to flame retardant plastic materials, and more particularly, to a flame retardant low smoke poly(vinyl chloride) composition.

BACKGROUND OF THE INVENTION

Poly(vinyl chloride), hereafter referred to as PVC, is extensively used in wire insulation and sheathing for electric cables because of its ready availability, mechanical toughness, low cost, resistance to chemicals and weathering, and good dielectric properties.

In use, PVC is always plasticized to overcome its natural rigidity and permit it to be processed into a flexible material. In addition, other additives such as thermal stabilizers, lubricants, pigments, fillers, impact modifiers, and flame retardants are generally employed to produce PVC compositions having desired properties.

Unmodified PVC is thermally unstable, decomposing at about 150° C. to release HCl and produce sites of unsaturation in the polymer which lead to chain crosslinking and scission, resulting in degradation of the polymer's properties. As the PVC decomposes, the resin becomes discolored, brittle, and finally insoluble.

To improve thermal stability, various thermal stabilizers are nearly always employed in PVC compositions. The stabilizers generally used are metallic salts of inorganic and organic acids and phenols, organometallics, epoxy compounds, and phosphates. In wire and cable applications, lead stabilzation systems are widely used.

Despite its thermal instability, unmodified PVC has relatively good flame retardant properties due to its high chlorine content. However, the plasticizer necessary for flexibility and good processing properties generally increaases the flammability of PVC compositions, especially if used at high levels. Moreover, when PVC burns, it produces considerable smoke, and the additional of flame retardant to plasticized compositions to reduce their flammability generally increases smoke generation upon burning. Smoke is particularly dangerous since it not only contains toxic by-products of combustion and thermal decomposition of the plastic, but also restricts visibility and disorients potential victims, resulting in panic.

A further problem with burning olefin-based polymers generally and PVC in particular is that when they burn they frequently flow and drip combustible materials, thus feeding and spreading the fire.

The plastics industry has long recognized that use of PVC in interior furnishings, building materials, and coverings for wire and cable presents the hazards of flame, toxic decomposition products, and smoke in the event of fire, as discussed above. It has therefore expended very considerable efforts to find additives for PVC which reduce thermal decomposition, flammability, and smoke in the event that such PVC compositions are subjected to high temperatures or flame.

Such research has yielded knowledge of several classes of stabilizers, flame retardants, smoke suppressors, plasticizers, etc., which function in PVC, and has disclosed many useful individual chemical compounds within those classes, but it has not yet provided a full understanding of how various additives interact with other additives in PVC and with PVC itself in PVC compositions exposed to high temperatures and/or flame. Accordingly, the preparation of PVC compositions having particular combinations of properties is still largely an empirical art rather than a well-developed science. In particular, PVC compositions having high flame retardancy coupled with the property of burning with evolution of only relatively small amounts of smoke which is light-colored rather than dark have not as yet been developed.

In the area of PVC-based compositions for wire and cable covering applications, it would be very desirable to have materials which are highly flame-retardant, tend to char rather than drip when burned or heated, produce a minimum amount of smoke when burned, and produce light-colored smoke rather than dark smoke, while still possessing the good processing properties, mechanical toughness, and resistance to environmental stresses for which PVC compositions are known.

SUMMARY OF THE INVENTION

The above-stated need is met in the present invention, which provides PVC-based thermoplastic compositions which are strongly flame retardant, tend to char rather than drip when burned, produce only relatively small amounts of light-colored smoke when burned, and still possess good processing properties, toughness, and resistance to environmental stresses.

The flame retardant low smoke PVC-based composition of the present invention includes poly(vinyl chloride), chlorinated poly(vinyl chloride), molybdenum oxide, alumina trihydrate, and isodecyl diphenyl phosphate. In addition, the composition also includes at least one heat stabilizer, at least one antioxidant, at least one lubricant, and at least one plasticizer in addition to the above-identified isodecyl diphenyl phosphate. The heat stabilizers, antioxidants, lubricants, and additional plasticizers are selected from those materials known to the art as being efficacious in PVC-based compositions.

DETAILED DESCRIPTION OF THE INVENTION

The flame retardant low smoke composition of the present invention has as its base resin a mixture of PVC and chlorinated PVC. Throughout this specification, all amounts of composition ingredients, including the amounts of PVC and chlorinated PVC, will be expressed as parts per hundred of the sum of PVC and chlorinated PVC in the composition.

All ingredients comprising the composition of this invention are commercially available materials, the identities of which are listed below:

A. Poly(vinyl chloride) resin having an inherent viscosity of 1.20, Chemical Abstracts Registry Number 9002-86-2, purchased from B. F. Goodrich Company;

B. TEMPRITE 627X563, chlorinated poly(vinyl chloride) resin, purchased from the B. F. Goodrich Company;

C. DYTHAL, dibasic lead phthalate, Chemical Abstracts Registry Number 57142-78-6, a standard PVC heat stabilizer, purchased from Associated Lead, Inc.;

d/ TRIBASE XL, tribasic lead sulfate, Chemical Abstracts Registry Number 12202-17-4, a standard PVC heat stabilizer, purchased from Associated Lead, Inc.;

e. SP 33 clay, a calcined aluminum silicate, Chemical Abstracts Registry Number 39388-40-4, a wire and cable electrical grade filler, purchased from Englehard Corp.;

f. CHEMGUARD 911C, molybdenum oxide, a flame retardant purchased from Sherwin Williams Co.;

g. HYDRAL 710B, alumina trihydrate, Chemical Abstracts Registry Number 21645-51-2, a flame retardant purchased from Alcoa;

h. Antimony trioxide, Chemical Abstracts Registry Number 1309-64-4, a flame retardent purchased from Anzon America;

i. IRGANOX 1010, a pentaerythritol ester named as 2,2-bis((3-( 3,5-bis(1,1-dimethylethyl-4-hydroxyphenyl)-1-oxopropxy)methyl)-1,3-propanediyl 3,5-bis(1,1-dimethylethyl)-4-hydroxybenzenepropanoate, Chemical Abstracts Registry Number 6683-19-8, a standard PVC antioxidant purchased from Ciba-Geigy Corp.;

j. DS 207, dibasic lead stearate, Chemical Abstracts Registry Number 56189-09-4 a lubricant purchased from Associated Lead, Inc.;

k. ROSS WAX-165, a standard PVC paraffin wax lubricant purchased from Ross Corp.;

l. SANTICIZER 148, isodecyl diphenyl phosphate, Chemical Abstracts Registry Number 29761-21-5, a phosphate-type plasticizer purchased from Monsanto;

m. HERCOFLEX 707, a proprietary pentaerythritol ester used as a high temperature plasticizer, and purchased from Hercules;

n. ELVALOY 704, an acrylic acid ethylene-vinyl acetate terpolymer, Chemical Abstracts Registry Number 26713-18-8, a plasticizer purchased from DuPont;

o. Stearic Acid, Chemical Abstracts Registry Number 57-11-4, a standard lubricant purchased from Synthetic Products, Inc.;

p. X-1052, Chemical Abstracts Registry Number 63449-39-8, a chlorinated paraffin containing approximately 52% chlorine, used as a flame retardant and purchased from Diamond Shamrock Corp.;

q. Epoxidized Soybean Oil, an epoxy-type plasticizer purchased from Argus, Division of Witco;

r. TIOTM, triisooctyl trimellitate, a plasticizer purchased from Exxon;

s. Tricresyl phosphate and trixylenyl phosphate plasticizers;

t. Calcium carbonate, zinc phosphate, and magnesium carbonate fillers;

In PVC-based thermoplastic materials, lead compounds such as dibasic lead phthalate and tribasic lead sulfate are frequently employed as heat stabilizers. However, other heat stabilizers can in principle be used, among them various proprietary soaps containing barium, cadmium, or zinc, such as MARK OHM, a barium cadmium soap. Organo tin compounds may also be employed.

Similarly, other antioxidants besides IRGANOX 1010 may in principle be used, among them various other IRGANOX materials, hindered phenols such as ETHYL 330, TOPANOL CA, and bisphenol A, and hindered amines such as SEE-NOX 412 S of Witco. ETHYL 330 is 4,4',4"-((2,4,6-trimethyl-1,3,5-benzenetriyl) tris(methylene))tris(2,6-bis(1,1-dimethylethyl))phenol, Chemical Abstracts Registry No. 1709-70-2. TOPANOL CA is 4,4',4"-(1-methyl-1-propanyl-3-ylidene) tris(2-(1,1-dimethylethyl))-5-methyl phenol, Chemical Abstracts Registry No. 1843-03-4.

Likewise, besides ELVALOY 741, triisooctyl trimellitate, and HERCOFLEX 707 plasticizers, others may in principle be used, among them medium and high molecular weight polyester plasticizers such as SANTICIZER S 429 and DRAPEX P-1 by Witco, and PLASTOLEINS 9780 and 9790 by Emery. Alternative trimellitate plastercizers includes trioctyl trimellilate, normal octyl normal decyl trimellitate, and triisononyl trimellitate.

Besides SP 33 clay filler, others may in principle be used, among them silicate fillers such as SATINTONE 2 and BURGESS 30 by Burgess.

Besides the X-1052 chlorinated paraffin employed, other halogenated organic materials may in principle be used, among them CHLOROWAX 70 and CHLOROWAX 500 by Diamon Shamrock, and CERECLOR 52 by Imperial Chemical Industries (I.C.I.).

The flame retardant low smoke composition of the present invention contains the following ingredients in the amounts listed:

poly(vinyl chloride), in an amount from about 50 to about 90 parts per hundred of resin, preferably from about 60 to about 90 parts per hundred of resin;

chlorinated poly(vinyl chloride), in an amount from about 10 to about 50 parts per hundred of resin, preferably from about 10 to about 40 parts per hundred of resin;

molybdenum oxide, in an amount from about 10 to about 30 parts per hundred of resin, preferably from about 15 to about 30 parts per hundred of resin;

alumina trihydrate, in an amount from about 10 to about 30 parts per hundred of resin, preferably from about 15 to about 30 parts per hundred of resin; and isodecyl diphenyl phosphate, in an amount from about 5 to about 30 parts per hundred of resin, preferably from about 10 to about 30 parts per hundred of resin.

The composition also includes the following materials, each of which must be efficacious in PVC-based plastic compositions, as known to the art;

at least one heat stabilizer, dibasic lead phthalate or tribasic lead sulfate for example, the total amount of such heat stabilizers being from about 4 to about 12 parts per hundred of resin, preferably from about 4 to about 10 parts per hundred of resin;

at least one antioxidant, IRGANOX 1010 for example, the total amount of said antioxidants being from about 0.05 to about 0.3 parts per hundred of resin;

at least one lubricant, for example stearic acid, paraffin wax, or dibasic lead stearate, the total amount of such lubricants being from about 0.15 to about 1.5 parts per hundred of resin; and at least one plasticizer in addition to the isodecyl diphenyl phosphate plasticizer, for example ELVALOY 741, epoxidized soy bean oil, triisooctyl trimellitate or HERCOFLEX 707, the total amount of such additional plasticizers being from about 20 to about 120 parts per hundred of resin, preferably from about 20 to about 90 parts per hundred of resin.

The composition may also include the following materials:

antimony trioxide, in an amount from about 0.5 to about 10 parts per hundred of resin, preferably from about 1 to about 8 parts per hundred of resin;

at least one filler suitable for use in PVC-based plastics, SP 33 clay for example, the total amount of such fillers being from about 10 to about 50 parts per hundred of resin, preferably from about 10 to about 40 parts per hundred of resin; and at least one chlorinated paraffin, X-1052 for example, the total amount of such chlorinated paraffins being from about 1 to about 10 parts per hundred of resin, preferably from about 3 to about 8 parts per hundred of resin.

In the flame retardant low smoke composition of the invention the alumina trihydrate and molybdenum oxide are most preferably employed in equal amounts. The composition of the invention may be embodied in formulations optimized for use as wire insulation and as cable jacketing, as shown below.

A wire insulation formulation contains the following ingredients in the amounts listed:

poly(vinyl chloride), in an amount from about 50 to about 90 parts per hundred of resin, preferably from about 60 to about 90 parts per hundred of resin;

chlorinated poly(vinyl chloride), in an amount from about 10 to about 50 parts per hundred of resin, preferably from about 10 to about 40 parts per hundred of resin;

molybdenum oxide, in an amount from about 10 to about 30 parts per hundred of resin, preferably from about 15 to about 30 parts per hundred of resin;

alumina trihydrate, in an amount from about 10 to about 30 parts per hundred of resin, preferably from about 15 to about 30 parts per hundred of resin;

isodecyl diphenyl phosphate, in an amount from about 5 to about 30 parts per hundred of resin, preferably from about 10 to about 30 parts per hundred of resin;

dibasic lead phthalate, in an amount from about 2 to about 6 parts per hundred of resin, preferably from about 2 to about 5 parts per hundred of resin;

tribasic lead sulphate, in an amount from about 2 to about 6 parts per hundred of resin, preferably from about 2 to about 5 parts per hundred of resin;

IRGANOX 1010, in an amount from about 0.05 to about 0.3 parts per hundred of resin;

dibasic lead stearate, in an amount fgrom about 0.1 to about 0.5 parts per hundred of resin;

Paraffin wax having a melting point of approximately 165° F., in an amount from about 0.05 to about 0.5 parts per hundred of resin;

HERCOFLEX 707 pentaerythritol ester, in an amount from about 20 to about 50 parts per hundred of resin, preferably from about 20 to about 40 parts per hundred of resin;

antimony trioxide, in an amount from about 0.5 to about 10 parts per hundred of resin, preferably from about 1 to about 8 parts per hundred of resin; and Calcined aluminum silicate clay filler, in an amount from about 10 to about 50 parts per hundred of resin, preferably from about 10 to about 40 parts per hundred of resin.

A cable jacketing formulation contains the following ingredients in the amounts listed:

poly(vinyl chloride), in an amount from about 50 to about 90 parts per hundred of resin, preferably from about 65 to about 85 parts per hundred of resin;

chlorinated poly(vinyl chloride), in an amount from about 10 to about 50 parts per hundred of resin, preferably from about 15 to about 35 parts per hundred of resin;

molybdenum oxide, in an amount from about 10 to about 30 parts per hundred of resin, preferably from about 20 to about 30 parts per hundred of resin;

alumina trihydrate, in an amount from about 10 to about 30 parts per hundred of resin, preferably from about 20 to about 30 parts per hundred of resin;

isodecyl diphenyl phosphate, in an amount from about 5 to about 30 parts per hundred of resin, preferably from about 15 to about 30 parts per hundred of resin;

dibasic lead phthlate, in an amount from about 2 to about 6 parts per hundred of resin, preferable from about 2 to about 5 parts per hundred of resin; tribasic lead sulphate, in an amount from about 2 to about 6 parts per hundred of resin, preferably from about 2 to about 5 parts per hundred of resin;

IRGANOX 1010, in an amount from about 0.05 to about 0.3 parts per hundred of resin;

stearic acid, in an amount from about 0.1 to about 0.5 parts per hundred of resin;

dibasic lead stearate, in an amount from about 0.1 to about 0.5 parts per hundred of resin;

Paraffin wax having a melting point of approximately 165° F., in an amount from about 0.05 to about 0.5 parts per hundred of resin;

ELVALOY 741, in an amount from about 10 to about 50 parts per hundred of resin, preferably from about 15 to about 40 parts per hundred of resin;

epoxidized soy bean oil, in an amount from about 5 to about 20 parts per hundred of resin, preferably from about 5 to about 15 parts per hundred of resin;

triisooctyl trimellitate, in an amount from about 10 to about 50 parts per hundred of resin, preferably from about 10 to about 35 parts per hundred of resin;

antimony trioxide, in an amount from about 0.5 to about 10 parts per hundred of resin, preferably from about 1 to about 8 parts per hundred of resin; and Chlorinated paraffin having approximately 52% chlorine, in an amount from about 1 to about 10 parts per hundred of resin, preferably from about 3 to about 8 parts per hundred of resin.

The composition of the invention is prepared using steps that are individually known to those skilled in the art, in a manner known to the art. A steam-heated blender is loaded with resin, coloring materials are added if required, then the several stabilizers are added and the ingredients are mixed for five minutes. Preheated plasticizers are next added and mixing is continued for an additional five minutes. Finally, fillers and lubricants are added and the composition is allowed to mix for a further five minutes. The blend of ingredients is then processed on a Banbury high intensity mixer for a predetermined time at a predetermined temperature for plastification, then dropped onto a hot two-roll mill. It is finnally stripped off the roll mill and diced. Twin screw extruders, continuous mixers, or other mixing equipment known to the art will also serve in place of the Banbury mixer.

EXPERIMENTAL SECTION

Formulations of the composition of the invention optimized respectively for wire insulation and for cable jacketing were prepared as shown below. Both of these formulations display excellent flame retardancy, tend to char rather than drip when heated or burned, and burn with evolution of only a relatively small amount of light-colored smoke. Ingredient amounts are shown as parts per hundred of the sum of PVC and chlorinated PVC resins employed, the units being abbreviated PHR.

Tests for Oxygen Index, Specific Optical Density of Smoke, and Determination of Smoke Particulates were performed using ASTM standard test procedures D-2863, E-662, and D-4100, respectively, and these test methods are expressly incorporated herein by reference.

PREPARATION OF WIRE INSULATION FORMULATION

Initially 30 PHR of HERCOFLEX 707 and 10 PHR of isodecyl diphenyl phosphate plasticizers were heated to 150° F. in a suitable container. In a blender, 85 PHR of poly(vinyl chloride) and 15 PHR of TEMPRITE 627X563 chlorinated poly(vinyl chloride) resins were combined (coloring material may also be added at this point if required), then 4 PHR of dibasic lead phthalate, 4 PHR of tribasic lead sulfate, 25 PHR of molybdenum oxide, 2 PHR of antimony trioxide, and 0.2 PHR of IRGANOX 1010 were added, and the combination was mixed for five minutes. The preheated plasticizers were then added and mixing was continued for a further five minutes. Finally, 20 PHR of SP 33 clay filler, 25 PHR of alumina trihydrate, 0.2 PHR of dibasic lead stearate, and 0.2 PHR of ROSS WAX 165 were added and mixing continued for a further five minutes. The blend of ingredients was then processed on a Banbury high intensity mixer for approximately 150 seconds at a temperature of 360° F. and was then dumped onto a hot two-roll mill. It was finally stripped from the roll mill and diced.

The composition exhibited an Oxygen Index of 40%, Maximum Smoke Specific Optical Densities of 200 (flaming) and 70 (smoldering), and a Smoke Particulates value of 4.0%.

PREPARATION OF CABLE JACKETING FORMULATION

Initially 20 PHR of ELVALOY 741, 20 PHR of isodecyl diphenyl phosphate, 5 PHR of epoxidized soybean oil, and 20 PHR of triisooctyl trimellitate plasticizers were heated to 150° F. in a suitable container. In a blender, 75 PHR of poly(vinyl chloride) and 25 PHR of TEMPRITE 627X563 chlorinated poly(vinyl chloride) resins were combined, coloring material was added, then 4 PHR of dibasic lead phthalate, 4 PHR of tribasic lead sulfate, 30 PHR of molybdenum oxide, 2 PHR of antimony trioxide, 0.2 PHR of IRGANOX 1010 and 5 PHR of X 1052 chlorinated paraffin were added and the combination was allowed to mix for five minutes. The preheated plasticizers were then added and mixing was continued for a further five minutes. Finally, 30 PHR of alumina trihydrate, 0.3 PHR of stearic acid, 0.2 PHR of dibasic lead stearate, and 0.2 PHR of ROSS WAX 165 were added and mixing continued a further five minutes. The blend of ingredients was then processed on a Banbury high intensity mixer for approximately 150 seconds at a temperature of 345° F. and was then dumped onto a hot two-roll mill. It was finally stripped from the mill and diced.

The composition exhibited an Oxygen Index of 34.0%, Maximum Smoke Specific optical Densities of 375 (flaming) and 125 (smoldering), and a Smoke Particulates value of 5.0%.

OTHER FORMULATIONS OF THE COMPOSITION OF THE INVENTION

The compositions listed in Tables I and II below were prepared according to the above procedure employing the listed relative amounts of ingredients.

Table I below shows a number of experimental preparations of a wire insulation formulation of the basic composition of the invention, the concentrations of the ingredients being varied to determine the effects of such concentration variations on the properties of the product composition. Table II similarly shows a number of experimental preparations of a cable jacketing formulation of the basic composition of the invention, for the same purpose.

TABLE I

| Ingredients | WIRE INSULATION FORMULATIONS* | | | | | | | | | | |
|---|---|---|---|---|---|---|---|---|---|---|---|
| | A | B | C | D | E | F | G | H | I | J | K |
| PVC | 85 | 75 | 85 | 50 | 85 | 30 | 85 | 85 | 0 | 100 | 85 |
| TEMPRITE 627X563 | 15 | 25 | 15 | 50 | 15 | 70 | 15 | 15 | 100 | 0 | 15 |
| Dibasic lead phthalate | 4 | 4 | 4 | 4 | 4 | 4 | 4 | 4 | 4 | 4 | 4 |
| Tribasic lead sulfate | 4 | 4 | 4 | 4 | 4 | 4 | 4 | 4 | 4 | 4 | 4 |
| SP 33 CLAY | 20 | 20 | 10 | 20 | 20 | 20 | 20 | 10 | 20 | 20 | 20 |
| Molybdenum oxide | 25 | 25 | 25 | 25 | 30 | 25 | 10 | 20 | 25 | 25 | — |
| Alumina trihydrate | 25 | 25 | 25 | 25 | 30 | 25 | 10 | 10 | 25 | 25 | — |
| Antimony Trioxide | 2 | 2 | 2 | 2 | 2 | 2 | 3 | 3 | 2 | 2 | 2 |
| IRGANOX 1010 | 0.2 | 0.2 | 0.2 | 0.2 | 0.2 | 0.2 | 0.2 | 0.2 | 0.2 | 0.2 | 0.2 |
| Dibasic lead stearate | 0.2 | 0.2 | 0.2 | 0.2 | 0.2 | 0.2 | 0.2 | 0.2 | 0.2 | 0.2 | 0.2 |
| Paraffin wax | 0.2 | 0.2 | 0.2 | 0.2 | 0.2 | 0.2 | 0.2 | 0.2 | 0.2 | 0.2 | 0.2 |
| Isodecyl diphenyl phosphate | 10 | 10 | 10 | 10 | 20 | 5 | 30 | 15 | 10 | 10 | 10 |
| HERCOFLEX 707 | 30 | 30 | 30 | 30 | — | 10 | — | — | — | — | — |
| Triisooctyl trimellitate | — | — | — | — | 20 | 10 | 20 | 10 | 15 | 15 | 20 |
| Tricresyl phosphate | — | — | — | 10 | — | 10 | — | — | — | — | — |
| Trixylenyl phosphate | — | — | 10 | — | — | — | — | — | — | — | — |
| Zinc phosphate | — | — | — | — | — | — | — | — | — | — | 25 |
| Calcium carbonate | — | — | 10 | — | — | — | — | — | — | — | — |
| Magnesium carbonate | — | — | — | — | — | — | — | — | — | — | 25 |
| DRAPEX P-1 | — | — | — | — | — | 20 | — | — | 15 | 15 | — |
| EMERY 9790 | — | — | — | — | — | — | 10 | 15 | — | — | 20 |
| Oxygen Index, % | 40.0 | 41.0 | 40.0 | 40.0 | 40.25 | 39.5 | 41.0 | 38.0 | 40.0 | 38.0 | 39.75 |
| Smoke Optical Density | | | | | | | | | | | |
| $D_m$ (corr.) flaming | 200 | 180 | 280 | 320 | 210 | 230 | 310 | 350 | 205 | 315 | 320 |
| $D_m$ (corr.) smoldering | 70 | 75 | 125 | 250 | 90 | 125 | 155 | 210 | 80 | 205 | 195 |
| Smoke Particulates, % | 4.0 | 4.1 | 5.2 | 5.0 | 4.3 | 4.2 | 4.3 | 4.8 | 4.0 | 4.9 | 5.0 |

*Amounts of ingredients are expressed as parts per hundred of the sum of the PVC and chlorinated PVC resins employed.

TABLE II

CABLE JACKETING FORMULATIONS*

| Ingredients | A | B | C | D | E | F | G | H | I | J | K | L | M | N | O | P |
|---|---|---|---|---|---|---|---|---|---|---|---|---|---|---|---|---|
| PVC | 75 | 75 | 75 | 75 | 75 | 75 | 75 | 75 | 75 | 75 | 50 | 75 | 75 | 50 | 90 | 90 |
| TEMPRITE 627X563 | 25 | 25 | 25 | 25 | 25 | 25 | 25 | 25 | 25 | 25 | 50 | 25 | 25 | 50 | 10 | 10 |
| ELVALOY 741 | 20 | 20 | 20 | 20 | 20 | 20 | 20 | 20 | 20 | 20 | 20 | — | 20 | 20 | 20 | 20 |
| Dibasic lead phthalate | 4 | 4 | 4 | 4 | 4 | 4 | 4 | 4 | 4 | 4 | 4 | 4 | 4 | 4 | 4 | 4 |
| Tribasic lead sulfate | 4 | 4 | 4 | 4 | 4 | 4 | 4 | 4 | 4 | 4 | 4 | 4 | 4 | 4 | 4 | 4 |
| Alumina trihydrate | — | 15 | 15 | 30 | — | 30 | 25 | 30 | 30 | 30 | 30 | 25 | 20 | 10 | 30 | 20 |
| Molybdenum oxide | — | 15 | 15 | 30 | 30 | 30 | 25 | 30 | 30 | 30 | 30 | 50 | 20 | 10 | 30 | 20 |
| Antimony Trioxide | 2 | 2 | 2 | 2 | 2 | 2 | 2 | 2 | 2 | 2 | 2 | 2 | 2 | 2 | 2 | 2 |
| IRGANOX 1010 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Stearic Acid | 0.3 | 0.3 | 0.3 | 0.3 | 0.3 | 0.3 | 0.1 | 0.3 | 0.3 | 0.3 | 0.3 | 0.3 | 0.3 | 0.3 | 0.3 | 0.3 |
| Dibasic lead stearate | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Paraffin wax | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| X-1052 | — | — | — | 5 | 5 | — | 5 | 10 | — | — | 5 | — | 5 | — | 5 | 5 |
| Isodecyl diphenyl phosphate | 25 | — | — | 20 | 20 | 20 | — | 50 | 25 | — | — | 10 | 5 | 30 | — | 20 |
| SANTICIZER S 429 | — | — | — | — | — | — | — | — | — | — | — | — | 35 | 20 | — | — |
| Epoxidized Soybean Oil | 5 | 5 | 5 | 5 | 5 | 5 | 5 | 10 | — | — | 5 | 10 | — | — | 20 | 10 |
| HEROFLEX 707 | — | — | — | — | — | 30 | — | — | — | 30 | — | — | — | — | — | — |
| Triisooctyl trimellitate | 20 | 20 | 20 | 20 | 20 | — | 20 | — | 10 | — | — | — | — | — | — | — |
| SP 33 CLAY | — | 20 | — | — | 30 | — | — | — | — | — | — | — | — | 20 | — | 10 |
| Tricresyl phosphate | — | 20 | — | — | — | — | 30 | — | 25 | 30 | 25 | — | — | — | — | — |
| Trixylenyl phosphate | — | — | 20 | — | — | 20 | — | — | — | — | 25 | — | — | — | — | — |
| Zinc Phosphate | 30 | — | — | — | 30 | — | — | — | — | — | — | — | 10 | 10 | — | — |
| Calcium carbonate | — | — | 20 | — | — | — | — | — | — | — | — | — | — | — | — | 10 |
| Magnesium Carbonate | 30 | — | — | — | — | — | — | — | — | — | — | — | 10 | 10 | — | — |
| DRAPEX P-1 | — | — | — | — | — | — | — | — | — | — | — | 45 | — | — | — | — |
| EMERY 9780 | — | — | — | — | — | — | — | — | — | — | — | — | — | — | — | 10 |
| EMERY 9790 | — | — | — | — | — | — | — | — | — | — | — | — | — | — | 20 | — |
| Oxygen Index, % | 35 | 30 | 29.5 | 34 | 33.5 | 32.7 | 33 | 35 | 34 | 31.25 | 35.25 | 34.25 | 36.0 | 36.5 | 32.75 | 33.0 |
| Smoke Optical Density | | | | | | | | | | | | | | | | |
| $D_m$ (corr.) flaming | 598 | 620 | 655 | 375 | 480 | 620 | 700 | 615 | 412 | 395 | 450 | 340 | 270 | 265 | 365 | 350 |
| $D_m$ (corr.) smoldering | 816 | 245 | 310 | 125 | 120 | 170 | 205 | 305 | 220 | 250 | 280 | 290 | 220 | 200 | 240 | 215 |
| Smoke Particulates, % | 5.9 | 7.2 | 6.1 | 5.0 | 5.8 | 6.2 | 6.3 | 6.0 | 5.9 | 5.9 | 6.1 | 5.2 | 5.0 | 5.0 | 5.1 | 5.2 |

*Amounts of ingredients are expressed as parts per hundred of the sum of the PVC and chlorinated PVC resins employed.

The compositons listed in Tables III and IV below are made according to the above procedure employing the listed relative amounts of ingredients. Table III shows possible wire insulation formulations, while Table IV shows possible jacketing formulations. With the exception of PVC and chlorinated PVC in formulations #1 and #2, each formulation in each table differs from the others in the concentration of only one ingredient. However, those skilled in the art will appreciate that compositions may be formulated in which the concentrations of any number of the listed ingredients may be within the concentration ranges shown for the respective ingredients individually, and that alternative materials may be employed for the heat stabilizers, antioxidants, supplementary plasticizers, fillers, and chlorinated paraffins shown.

TABLE III

WIRE INSULATION FORMULATIONS*

| Ingredients | #1 | #2 | #3 | #4 | #5 | #6 | #7 | #8 | #9 | #10 | #11 | #12 |
|---|---|---|---|---|---|---|---|---|---|---|---|---|
| PVC | 50 | 90 | 85 | 85 | 85 | 85 | 85 | 85 | 85 | 85 | 85 | 85 |
| Chlorinated PVC | 50 | 10 | 15 | 15 | 15 | 15 | 15 | 15 | 15 | 15 | 15 | 15 |
| Molybdenum oxide | 25 | 25 | 10 | 30 | 25 | 25 | 25 | 25 | 25 | 25 | 25 | 25 |
| Alumina trihydrate | 25 | 25 | 25 | 25 | 10 | 30 | 25 | 25 | 25 | 25 | 25 | 25 |
| Isodecyl diphenyl phosphate | 10 | 10 | 10 | 10 | 10 | 10 | 5 | 30 | 10 | 10 | 10 | 10 |
| Dibasic lead phthalate | 4 | 4 | 4 | 4 | 4 | 4 | 4 | 4 | 2 | 6 | 4 | 4 |
| Tribasic lead sulfate | 4 | 4 | 4 | 4 | 4 | 4 | 4 | 4 | 4 | 4 | 2 | 6 |
| IRGANOX 1010 | 0.2 | 0.2 | 0.2 | 0.2 | 0.2 | 0.2 | 0.2 | 0.2 | 0.2 | 0.2 | 0.2 | 0.2 |
| Dibasic lead stearate | 0.2 | 0.2 | 0.2 | 0.2 | 0.2 | 0.2 | 0.2 | 0.2 | 0.2 | 0.2 | 0.2 | 0.2 |
| Paraffin wax | 0.2 | 0.2 | 0.2 | 0.2 | 0.2 | 0.2 | 0.2 | 0.2 | 0.2 | 0.2 | 0.2 | 0.2 |
| HERCOFLEX 707 | 30 | 30 | 30 | 30 | 30 | 30 | 30 | 30 | 30 | 30 | 30 | 30 |
| Antimony trioxide | 2 | 2 | 2 | 2 | 2 | 2 | 2 | 2 | 2 | 2 | 2 | 2 |
| clay-type filler | 20 | 20 | 20 | 20 | 20 | 20 | 20 | 20 | 20 | 20 | 20 | 20 |

| Ingredients | #13 | #14 | #15 | #16 | #17 | #18 | #19 | #20 | #21 | #22 | #23 | #24 |
|---|---|---|---|---|---|---|---|---|---|---|---|---|
| PVC | 85 | 85 | 85 | 85 | 85 | 85 | 85 | 85 | 85 | 85 | 85 | 85 |
| Chlorinated PVC | 15 | 15 | 15 | 15 | 15 | 15 | 15 | 15 | 15 | 15 | 15 | 15 |
| Molybdenum oxide | 25 | 25 | 25 | 25 | 25 | 25 | 25 | 25 | 25 | 25 | 25 | 25 |
| Alumina trihydrate | 25 | 25 | 25 | 25 | 25 | 25 | 25 | 25 | 25 | 25 | 25 | 25 |
| Isodecyl diphenyl phosphate | 10 | 10 | 10 | 10 | 10 | 10 | 10 | 10 | 10 | 10 | 10 | 10 |
| Dibasic lead phthalate | 4 | 4 | 4 | 4 | 4 | 4 | 4 | 4 | 4 | 4 | 4 | 4 |
| Tribasic lead sulfate | 4 | 4 | 4 | 4 | 4 | 4 | 4 | 4 | 4 | 4 | 4 | 4 |
| IRGANOX 1010 | 0.05 | 0.3 | 0.2 | 0.2 | 0.2 | 0.2 | 0.2 | 0.2 | 0.2 | 0.2 | 0.2 | 0.2 |
| Dibasic lead stearate | 0.2 | 0.2 | 0.1 | 0.5 | 0.2 | 0.2 | 0.2 | 0.2 | 0.2 | 0.2 | 0.2 | 0.2 |
| Paraffin wax | 0.2 | 0.2 | 0.2 | 0.2 | 0.05 | 0.5 | 0.2 | 0.2 | 0.2 | 0.2 | 0.2 | 0.2 |
| HERCOFLEX 707 | 30 | 30 | 30 | 30 | 30 | 30 | 20 | 50 | 30 | 30 | 30 | 30 |
| Antimony trioxide | 2 | 2 | 2 | 2 | 2 | 2 | 2 | 2 | 0.5 | 10 | 2 | 2 |

TABLE III-continued

WIRE INSULATION FORMULATIONS*

| clay-type filler | 20 | 20 | 20 | 20 | 20 | 20 | 20 | 20 | 20 | 20 | 10 | 50 |
|---|---|---|---|---|---|---|---|---|---|---|---|---|

*Amounts of ingredients are expressed as parts per hundred of the sum of the PVC and chlorinated PVC resins employed.

TABLE IV

WIRE JACKET FORMULATIONS*

| Ingredients | #1 | #2 | #3 | #4 | #5 | #6 | #7 | #8 | #9 | #10 | #11 | #12 | #13 | #14 | #15 |
|---|---|---|---|---|---|---|---|---|---|---|---|---|---|---|---|
| PVC | 50 | 90 | 75 | 75 | 75 | 75 | 75 | 75 | 75 | 75 | 75 | 75 | 75 | 75 | 75 |
| Chlorinated PVC | 50 | 10 | 25 | 25 | 25 | 25 | 25 | 25 | 25 | 25 | 25 | 25 | 25 | 25 | 25 |
| Molybdenum oxide | 30 | 30 | 10 | 30 | 30 | 30 | 30 | 30 | 30 | 30 | 30 | 30 | 30 | 30 | 30 |
| Alumina trihydrate | 30 | 30 | 30 | 30 | 10 | 30 | 30 | 30 | 30 | 30 | 30 | 30 | 30 | 30 | 30 |
| Isodecyl diphenyl phosphate | 20 | 20 | 20 | 20 | 20 | 20 | 5 | 30 | 20 | 20 | 20 | 20 | 20 | 20 | 20 |
| Dibasic lead phthalate | 4 | 4 | 4 | 4 | 4 | 4 | 4 | 4 | 2 | 6 | 4 | 4 | 4 | 4 | 4 |
| Tribasic lead sulfate | 4 | 4 | 4 | 4 | 4 | 4 | 4 | 4 | 4 | 4 | 2 | 6 | 4 | 4 | 4 |
| IRGANOX 1010 | 0.2 | 0.2 | 0.2 | 0.2 | 0.2 | 0.2 | 0.2 | 0.2 | 0.2 | 0.2 | 0.2 | 0.2 | 0.05 | 0.3 | 0.2 |
| Stearic acid | 0.3 | 0.3 | 0.3 | 0.3 | 0.3 | 0.3 | 0.3 | 0.3 | 0.3 | 0.3 | 0.3 | 0.3 | 0.3 | 0.3 | 0.1 |
| Dibasic lead stearate | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Paraffin wax | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| ELVALOY 741 | 20 | 20 | 20 | 20 | 20 | 20 | 20 | 20 | 20 | 20 | 20 | 20 | 20 | 20 | 20 |
| Epoxidized soybean oil | 5 | 5 | 5 | 5 | 5 | 5 | 5 | 5 | 5 | 5 | 5 | 5 | 5 | 5 | 5 |
| Triisooctyl trimellitate | 20 | 20 | 20 | 20 | 20 | 20 | 20 | 20 | 20 | 20 | 20 | 20 | 20 | 20 | 20 |
| Antimony trioxide | 2 | 2 | 2 | 2 | 2 | 2 | 2 | 2 | 2 | 2 | 2 | 2 | 2 | 2 | 2 |
| Chlorinated paraffin | 5 | 5 | 5 | 5 | 5 | 5 | 5 | 5 | 5 | 5 | 5 | 5 | 5 | 5 | 5 |

| Ingredients | #16 | #17 | #18 | #19 | #20 | #21 | #22 | #23 | #24 | #25 | #26 | #27 | #28 | #29 | #30 |
|---|---|---|---|---|---|---|---|---|---|---|---|---|---|---|---|
| PVC | 75 | 75 | 75 | 75 | 75 | 75 | 75 | 75 | 75 | 75 | 75 | 75 | 75 | 75 | 75 |
| Chlorinated PVC | 25 | 25 | 25 | 25 | 25 | 25 | 25 | 25 | 25 | 25 | 25 | 25 | 25 | 25 | 25 |
| Molybdenum oxide | 30 | 30 | 30 | 30 | 30 | 30 | 30 | 30 | 30 | 30 | 30 | 30 | 30 | 30 | 30 |
| Alumina trihydrate | 30 | 30 | 30 | 30 | 30 | 30 | 30 | 30 | 30 | 30 | 30 | 30 | 30 | 30 | 30 |
| Isodecyl diphenyl phosphate | 20 | 20 | 20 | 20 | 20 | 20 | 20 | 20 | 20 | 20 | 20 | 20 | 20 | 20 | 20 |
| Dibasic lead phthalate | 4 | 4 | 4 | 4 | 4 | 4 | 4 | 4 | 4 | 4 | 4 | 4 | 4 | 4 | 4 |
| Tribasic lead sulfate | 4 | 4 | 4 | 4 | 4 | 4 | 4 | 4 | 4 | 4 | 4 | 4 | 4 | 4 | 4 |
| IRGANOX 1010 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Stearic acid | 0.5 | 0.3 | 0.3 | 0.3 | 0.3 | 0.3 | 0.3 | 0.3 | 0.3 | 0.3 | 0.3 | 0.3 | 0.3 | 0.3 | 0.3 |
| Dibasic lead stearate | 0.2 | 0.1 | 0.5 | 0.2 | 0.2 | 0.2 | 0.2 | 0.2 | 0.2 | 0.2 | 0.2 | 0.2 | 0.2 | 0.2 | 0.2 |
| Paraffin wax | 0.2 | 0.2 | 0.2 | 0.05 | 0.5 | 0.2 | 0.2 | 0.2 | 0.2 | 0.05 | 0.5 | 0.2 | 0.2 | 0.2 | 0.2 |
| ELVALOY 741 | 20 | 20 | 20 | 20 | 20 | 10 | 50 | 20 | 20 | 20 | 20 | 10 | 50 | 20 | 20 |
| Epoxidized soybean oil | 5 | 5 | 5 | 5 | 5 | 5 | 5 | 5 | 20 | 5 | 5 | 5 | 5 | 5 | 20 |
| Triisooctyl trimellitate | 20 | 20 | 20 | 20 | 20 | 20 | 20 | 20 | 20 | 10 | 50 | 20 | 20 | 20 | 20 |
| Antimony trioxide | 2 | 2 | 2 | 2 | 2 | 2 | 2 | 2 | 2 | 2 | 2 | 0.5 | 10 | 2 | 2 |
| Chlorinated paraffin | 5 | 5 | 5 | 5 | 5 | 5 | 5 | 5 | 5 | 5 | 5 | 5 | 5 | 1 | 10 |

*Amounts of ingredients are expressed as parts per hundred of the sum of the PVC and chlorinated PVC resins employed.

I claim:

1. A flame retardant low smoke thermoplastic composition comprising the below-listed materials, amounts being expressed as parts per hundred of the sum of poly(vinyl chloride) and chlorinated poly(vinyl chloride) resins in the composition:
   poly(vinyl chloride), in an amount from about 50 to about 90 parts per hundred of resin;
   chlorinated poly(vinyl chloride), in an amount from about 10 to about 50 parts per hundred of resin;
   molybdenum oxide, in an amount from about 10 to about 30 parts per hundred of resin;
   alumina trihydrate, in an amount from about 10 to about 30 parts per hundred of resin; and
   isodecyl diphenyl phosphate, in an amount from about 5 to about 30 parts per hundred of resin;
   said thermoplastic composition also including:
   at least one heat stabilizer efficacious in PVC-based plastic materials, the total amount of said heat stabilizers in said thermoplastic composition being from about 4 to about 12 parts per hundred of resin;
   at least one antioxidant efficacious in PVC-based plastic materials, the total amount of said antioxidants in said thermoplastic composition being from about 0.05 to about 0.3 parts per hundred of resin;
   at least one lubricant efficacious in PVC-based plastic materials, the total amount of said lubricants in said thermoplastic composition being from about 0.15 to about 1.5 parts per hundred of resin; and
   at least one plasticizer in addition to said isodecyl diphenyl phosphate plasticizer, said additional plasticizers being efficacious in PVC-based plastic materials, the total amount of said additional plasticizers in said thermoplastic composition being from about 20 to about 120 parts per hundred of resin.

2. The composition of claim 1, wherein said molybdenum oxide and said alumina trihydrate are present in equal amounts.

3. The composition of claim 1, further comprising antimony trioxide in an amount from about 0.5 to about 10 parts per hundred of resin.

4. The composition of claim 1 further comprising at least one filler suitable for use in PVC-based plastic materials, the total amount of said fillers in said thermoplastic composition being from about 10 to about 50 parts per hundred of resin.

5. The composition of claim 1, further comprising at least one chlorinated paraffin, the total amount of said chlorinated paraffins in said thermoplastic composition being from about 1 to about 10 parts per hundred of resin.

6. The composition of claim 1, wherein said heat stabilizers are dibasic lead phthalate in an amount from about 2 to about 6 parts per hundred of resin, and tribasic lead sulfate in an amount from about 2 to about 6 parts per hundred of resin.

7. The composition of claim 1, wherein said antioxidant is selected from the group consisting of 4,4',4''-(1-methyl-1-propanyl-3-ylidene) tris (2-(1,1-dimethylethyl))-5-methyl phenol; 2,2 bis ((3-(3,5-bis(1,1-dimethylethyl)-4-hydroxyphenyl)-1-oxopropoxy)methyl)-1,3-propanediyl 3,5-bis(1,1-dimethylethyl)-4-hydroxy benzene propanoate; and 4,4',4''-(2,4,6-trimethyl-1,3,5-benzenetriyl) tris(-methylene) tris 2,6-bis(1,1-dimethyl ethyl))phenol.

8. The composition of claim 1, wherein said lubricants are dibasic lead stearate in an amount from about 0.1 to about 0.5 parts per hundred of resin, and paraffin wax in an amount from 0.05 to about 0.5 parts per hundred of resin.

9. The composition of claim 1, wherein said additional plasticizer is a pentaerytritol ester.

10. The composition of claim 1, wherein said additional plasticizer is a medium or high molecular weight polyester plasticizer.

11. The composition of claim 4, wherein said filler is a calcined aluminum silicate clay.

12. The composition of claim 1, wherein said additional plasticizers are an acrylic acid-ethylene-vinyl acetate terpolymer in an amount from 10 to about 50 parts per hundred of resins, epoxidized soybean oil in an amount from about 5 to about 20 parts per hundred of resin, and triisooctyltrimellitate in an amount from about 10 to about 50 parts per hundred of resin.

13. An insulated wire comprising: at least one electrically conductive wire and an insulation about said at least one wire, said insulation comprising a thermoplastic composition containing the below-listed materials, amounts being expressed as parts per hundred of the sum of poly(vinyl chloride) and chlorinated poly(vinyl chloride) resins in the composition:

poly(vinyl chloride), in an amount from about 50 to about 90 parts per hundred of resin;

chlorinated poly(vinyl chloride), in an amount from about 10 to about 50 parts per hundred of resin;

molybdenum oxide, in an amount from about 10 to about 30 parts per hundred of resin;

alumina trihydrate, in an amount from about 10 to about 30 parts per hundred of resin; and isodecyl diphenyl phosphate, in an amount from about 5 to about 30 parts per hundred of resin;

said thermoplastic composition also including:

at least one heat stabilizer efficacious in PVC-based plastic materials, the total amount of said heat stabilizers in said thermoplastic composition being from about 4 to about 12 parts per hundred of resin;

at least one antioxidant efficacious in PVC-based plastic materials, the total amount of said antioxidants in said thermoplastic composition being from about 0.05 to about 0.3 parts per hundred of resin;

at least one lubricant efficacious in PVC-based plastic materials, the total amount of said lubricants in said thermoplastic composition being from about 0.15 to about 1.5 parts per hundred of resin;

at least one plasticizer in addition to said isodecyl diphenyl phosphate plasticizer, said additional plasticizers being efficacious in PVC-based plastic materials, the total amount of said additional plasticizers in said thermoplastic composition being from about 20 to about 120 parts per hundred of resin;

antimony trioxide in an amount from about 0.5 to about 10 parts per hundred of resin; and at least one filler suitable for use in PVC-based plastic materials, the total amount of said fillers in said thermoplastic composition being from about 10 to about 50 parts per hundred of resin.

14. A jacketed electrical cable comprising: at least one electrical cable, and cable jacketing about said at least one cable, said cable jacketing comprising a thermoplastic composition containing the below-listed materials, amounts being expressed as parts per hundred of the sum of poly(vinyl chloride) and chlorinated poly(vinyl chloride) resins in the composition:

poly(vinyl chloride), in an amount from about 50 to about 90 parts per hundred of resin;

chlorinated poly(vinyl chloride), in an amount from about 10 to about 50 parts per hundred of resin;

molybdenum oxide, in an amount from about 10 to about 30 parts per hundred of resin;

alumina trihydrate, in an amount from about 10 to about 30 parts per hundred of resin; and isodecyl diphenyl phosphate, in an amount from about 5 to about 30 parts per hundred of resin;

said thermoplastic composition also including:

at least one heat stabilizer efficacious in PVC-based plastic materials, the total amount of said heat stabilizers in said thermoplastic composition being from about 4 to about 12 parts per hundred of resin;

at least one antioxidant efficacious in PVC-based plastic materials, the total amount of said antioxidants in said thermoplastic composition being from about 0.05 to about 0.3 parts per hundred of resin;

at least one lubricant efficacious in PVC-based plastic materials, the total amount of said lubricants in said thermoplastic composition being from about 0.15 to about 1.5 parts per hundred of resin;

at least one plasticizer in addition to said isodecyl diphenyl phosphate plasticizer, said additional plasticizers being efficacious in PVC-based plastic materials, the total amount of said additional plasticizers in said thermoplastic composition being from about 20 to about 120 parts per hundred of resin;

antimony trioxide in an amount from about 0.5 to about 10 parts per hundred of resin; and at least one chlorinated paraffin, the total amount of said chlorinated paraffins in said thermoplastic composition being from about 1 to about 10 parts per hundred of resin.

* * * * *

UNITED STATES PATENT AND TRADEMARK OFFICE
CERTIFICATE OF CORRECTION

PATENT NO. : 4,670,494

DATED : June 2, 1987

INVENTOR(S) : Nicholas J. Semenza, Jr.

It is certified that error appears in the above-identified patent and that said Letters Patent is hereby corrected as shown below:

Column 1, line 34, "stabilzation" should read --stabilization--

Column 1, line 40, "increaases" should read --increases--

Column 1, lines 42-43, "addi- tional of flame retardant" should read --addi- tion of flame retardants--

Column 2, line 56, "A. Poly(vinyl chloride)" should read --a. Poly(vinyl chloride)--

Column 2, line 57, "of 1.20," should read --of 1.02,--

Column 2, line 58, "from B.F." should read --from the B.F.--

Column 2, line 59, "B. TEMPRITE" should read --b. TEMPRITE--

Column 2, line 62, "C. DYTHAL," should read --c. DYTHAL,--

Column 2, line 65, "d/ TRIBASE" should read --d. TRIBASE--

Column 3, line 11, "retardent" should read --retardant--

Column 3, line 14,
"2,2-bis((3-(    3,5-bis(1,1-dimethylethyl-4-hydroxy-"
should read
--2,2-bis((3-(3,5-bis(1,1-dimethylethyl)-4-hydroxy- --

Column 3, line 15, "-1-oxopropxy)" should read -- -1-oxopropoxy)--

Column 3, line 32, "n. ELVALOY 704," should read --n. ELVALOY 741,--

UNITED STATES PATENT AND TRADEMARK OFFICE
CERTIFICATE OF CORRECTION

PATENT NO. : 4,670,494
DATED : June 2, 1987           Page 2 of 2
INVENTOR(S) : Nicholas J. Semenza, Jr.

It is certified that error appears in the above-identified patent and that said Letters Patent is hereby corrected as shown below:

Column 4, line 7, "plastercizers includes" should read --plasticizers include--

Column 4, line 16, "Diamon" should read --Diamond--

Column 5, line 38, "fgrom" should read --from--

Column 6, line 4, "phthlate" should read --phthalate--

Column 6, line 5, "preferable" should read --preferably--

Column 6, line 6, "resin; tribasic" should read --resin; (new paragraph beginning with 'tribasic')--

Column 6, line 49, "finnally" should read --finally--

Column 8, line 20, "optical" should read --Optical--

Column 9, Table II, line 20, "HEROFLEX 707" should read --HERCOFLEX 707--

Signed and Sealed this

Fifteenth Day of October, 1991

Attest:

HARRY F. MANBECK, JR.

Attesting Officer      Commissioner of Patents and Trademarks